United States Patent
Rho

(10) Patent No.: US 7,486,355 B2
(45) Date of Patent: Feb. 3, 2009

(54) COLOR FILTER PANEL AND LIQUID CRYSTAL DISPLAY INCLUDING THE SAME

(75) Inventor: Soo-Gyu Rho, Suwon-si (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 11/687,173

(22) Filed: Mar. 16, 2007

(65) Prior Publication Data

US 2007/0165158 A1 Jul. 19, 2007

Related U.S. Application Data

(63) Continuation of application No. 10/917,186, filed on Aug. 10, 2004, now Pat. No. 7,212,261.

(30) Foreign Application Priority Data

Oct. 16, 2003 (KR) .............................. 2003-72092

(51) Int. Cl.
*G02F 1/1335* (2006.01)
(52) U.S. Cl. ............................ 349/106; 353/84; 345/88
(58) Field of Classification Search .................. 349/106, 349/105, 109, 110, 187; 353/84; 345/87, 345/88
See application file for complete search history.

(56) References Cited

U.S. PATENT DOCUMENTS

| 6,335,774 | B1 * | 1/2002 | Ono | 349/106 |
| 6,567,060 | B1 * | 5/2003 | Sekiguchi | 345/87 |
| 6,900,864 | B2 * | 5/2005 | Iino | 349/115 |
| 6,909,479 | B2 * | 6/2005 | Iijima | 349/109 |
| 7,212,261 | B2 * | 5/2007 | Rho | 349/106 |

* cited by examiner

*Primary Examiner*—Thoi V Duong
(74) *Attorney, Agent, or Firm*—F. Chau & Associates, LLC

(57) ABSTRACT

An LCD comprising a first substrate having an inner surface and an outer surface; a green color filter formed on the outer surface of the first substrate; red, green, and blue color filters formed on the inner surface of the first substrate; a second substrate facing the first substrate and having an inner surface and an outer surface; a pixel electrode formed on the inner surface of the second substrate; a common electrode formed on the inner surface of one of the first and second substrates; and a liquid crystal layer disposed between the first substrate and the second substrate is provided. By this structure, a green light having color purity is produced. The manufacturing method of an LCD is simplified by replacing the black matrix with the overlapped color filters.

10 Claims, 3 Drawing Sheets

COLOR FILTER PANEL AND LIQUID CRYSTAL DISPLAY INCLUDING THE SAME

CROSS REFERENCE TO RELATED APPLICATIONS

This application is a continuation of U.S. patent application Ser. No. 10/917,186, filed Aug. 10, 2004, now U.S. Pat. No. 7,212,261 which claims priority to Korean Application 2003-72092, filed Oct. 16, 2003, the disclosures of which are incorporated by reference herein in their entirety.

BACKGROUND OF THE INVENTION (a) Field of the Invention

The present invention relates to liquid crystal displays (LCDs), and in detail, to a method for improving display quality and viewing angle of LCDs.

(b) Description of the Related Art

An LCD includes two panels provided with field-generating electrodes, and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

In an LCD, usually, red, green, and blue color filters are sequentially disposed. Color images are displayed by controlling intensity of light which passes through the color filters.

However, there are limitations in displaying full colors by using three color filters.

Recently, as LCDs have been gaining popularity as multimedia displays, the need for good color reproducibility has increased. Especially, when an LCD is used as a television, good color reproducibility is extremely important.

When color reproducibility is discussed, the green color is important. The green color of the National Television Standards Committee (NTSC) is marked at x=0.21, y=0.70 on color coordinates of the International Commission of Illumination (CIE). However, the green light from the conventional green color filter of an LCD television having a thickness of 1.9 μm is marked at x=0.275, y=0.60 on the CIE color coordinate system.

When the conventional green color filter is used, the color reproducibility reaches only up to 72% of natural color. If one wishes to make a green color filter producing green color of NTSC which allows color reproducibility of 80% to 100%, one of the following two methods may be used. The first is increasing the dispersion density of pigments in the color filter, and the second is increasing the thickness of the color filter. However, when the dispersion density of pigments in the color filter is increased, stability of the photoresist of the color filter is degraded. When the thickness of the color filter is increased, the color filter needs to have a thickness of about 7.6 μm, which is four times thicker than that of the normal color filter. This causes difficulty in forming the color filter.

SUMMARY OF THE INVENTION

To solve such a problem, the present invention comprises a color filter panel having green color filters on both sides thereof.

In more detail, a liquid crystal display comprising a first substrate having an inner surface and an outer surface; a green color filter formed on the outer surface of the first substrate; red, green, and blue color filters formed on the inner surface of the first substrate; a second substrate facing the first substrate and having an inner surface and an outer surface; a pixel electrode formed on the inner surface of the second substrate; a common electrode formed on the inner surface of one of the first and second substrates; and a liquid crystal layer disposed between the first substrate and the second substrate is provided.

The green color filter formed on the outer surface of the first substrate may be disposed on the whole display area except at red and blue pixel areas, the green and blue color filters formed on the inner surface of the first substrate are respectively disposed on green and blue pixel areas, and the red color filter formed on the inner surface of the first substrate is disposed on the whole display area except at the green and blue pixel areas.

The green color formed on the outer surface of the first substrate may be at least 2.5 times the thickness of the green color filter formed on the inner surface of the first substrate.

A color filter panel comprising a transparent insulating substrate having two surfaces; a green color filter formed on a first surface of the insulating substrate; and red, green, and blue color filters formed on a second surface of the insulating substrate, wherein the green color filter formed on the first surface is removed in predetermined areas to expose part of the first surface of the insulating substrate, the red color filter formed on the second surface is disposed on the area except at the areas that the green and blue color filters are disposed, and the red and blue color filters formed on the second surface are seen through the predetermined areas exposing the first surface of the insulating substrate is provided.

The color filter panel may further include a transparent electrode formed on the red, green, and blue color filters. The thickness of the green color filter formed on the first surface may be 2.5 times the thickness of the green color filter formed on the second surface.

BRIEF DESCRIPTION OF THE DRAWINGS

The above and other advantages of the present invention will become more apparent by describing preferred embodiments thereof in detail with reference to the accompanying drawings, in which.

DETAILED DESCRIPTION OF THE PREFERRED EMBODIMENTS

Figure 1:
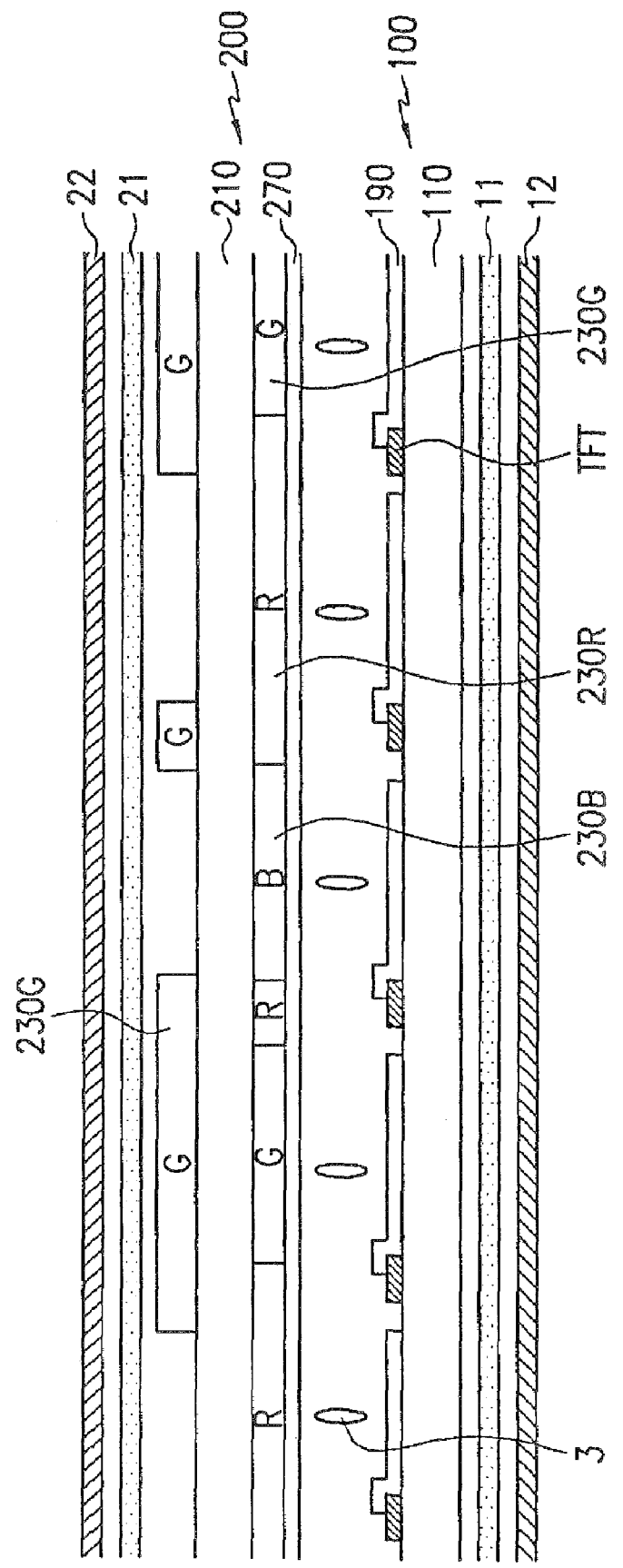
FIG. 1 is a sectional view of a liquid crystal display (LCD) according to an exemplary embodiment of the present invention.

The present invention will now be described more fully hereinafter with reference to the accompanying drawings, in which preferred embodiments of the invention are shown.

The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Now, liquid crystal displays according to embodiments of the present invention will be described with reference to the accompanying drawings.

Figure 2:
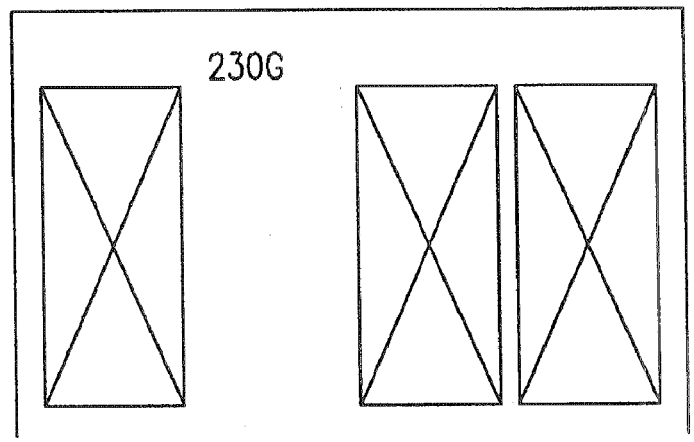
FIG. 2 is a layout view of the color filter panel of the LCD according to the exemplary embodiment of the present invention shown from the top side.
Figure 3:
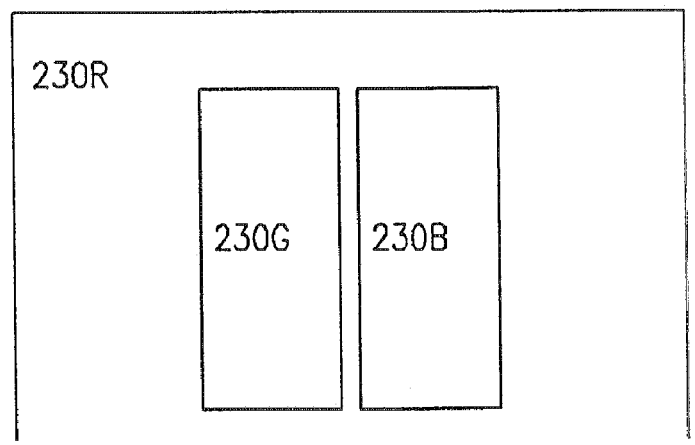
FIG. 3 is a layout view of the color filter panel of the LCD according to the exemplary embodiment of the present invention shown from the bottom side.

FIG. 1 is a sectional view of a liquid crystal display (LCD) according to an exemplary embodiment of the present invention. FIG. 2 is a layout view of the color filter panel of the LCD according to the exemplary embodiment of the present invention shown from the top side. FIG. 3 is a layout view of the color filter panel of the LCD according to the exemplary embodiment of the present invention shown from the bottom side.

An LCD according to an exemplary embodiment includes a thin film transistor (TFT) array panel 100, a color filter panel 200 facing the TFT array panel 100, a liquid crystal layer disposed between the two panels 100 and 200, a pair of compensation films 11 and 21 respectively disposed on the outside of the two panels 100 and 200, and a pair of polarizing films 12 and 22 respectively disposed on outside of the two compensation films 11 and 12.

The TFT array panel 100 will now be described in detail.

A plurality of pixel electrodes 190 made of indium tin oxide (ITO) or indium zinc oxide (IZO) are formed on a transparent substrate such as glass. Each pixel electrode 190 is connected to a TFT which is a switching element and is applied an image signal voltage through the TFT. Here, the TFT has a gate electrode connected to a gate line (not illustrated) transmitting scanning signals, a source electrode connected to a data line (not illustrated) transmitting image signals, and a drain electrode connected to the pixel electrode 190 that switches the image signals according to the scanning signals.

For a reflective LCD, the pixel electrode 190 is formed of a reflective metal instead of a transparent material, and the lower polarizing film 12 and the lower compensation film 11 are omitted.

Next, the color filter panel 200 will be described in detail.

Red, green, and blue color filters 230R, 230G, and 230B and a common electrode 270 made of a transparent conductive material such as indium tin oxide (ITO) or indium zinc oxide (IZO) are formed on the lower surface of an upper substrate 210 made of a transparent insulating material such as glass.

Here, the green color filter 230G and the blue color filter 230B are respectively formed on the corresponding pixel areas. The red color filter 230R is formed on the whole display area except at the areas of the green and blue color filters 230G and 230B, but including the red pixel area.

The thickness of the color filters 230R, 230G, and 230B are about 1.9 μm.

A green color filter 230G is formed on the upper surface of the upper substrate 210.

The green color filter 230G formed on the upper surface of the upper substrate 210 is disposed on the whole area of the display area except at the areas of the red and blue pixels.

Here, the display area means an area to display images in an LCD. The green color filter 230G formed on the upper surface of the upper substrate 210 has a thickness of about 5.7 μm.

The thickness of the color filters formed on the lower and upper surfaces of the upper substrate 210 may be modified according to their properties. However, under any circumstances, the thickness ratio of the green color filter on the lower surface to that on the upper surface is preferably over 1:2.5.

As described above, when green color filter 230G is formed on the upper surface of the upper substrate 210, and the red, green, and blue color filters 230R, 230G, and 230B are formed on the lower surface of the upper substrate 210, a red light and a blue light are respectively produced by the red color filter 230R and the blue color filter 230B having thickness of about 1.9 μm in the red and blue pixels, and a green light having high color purity is produced by the green color filters 230G having a total thickness of about 7.6 μm in the green pixel. The red color filter 230R and the green color filter 230G overlap each other to block almost all of the light in the areas between the pixel areas and the area around the display area. The overlapped red and green color filters 230R and 230G play a role of a black matrix.

The lower polarizing film 12 and the upper polarizing film 22 are preferably disposed to make their polarizing axes perpendicular to each other. Under such polarizing films disposition, the LCD shows a normally black mode such that black is displayed when there is no electric field in the liquid crystal layer According to the present invention, the green color filter 230G can have sufficient thickness since the green color filters 230G are formed on both side of the color filter panels 200. Such a green color filter having sufficient thickness can produce a green light having high color purity.

Figure 4:
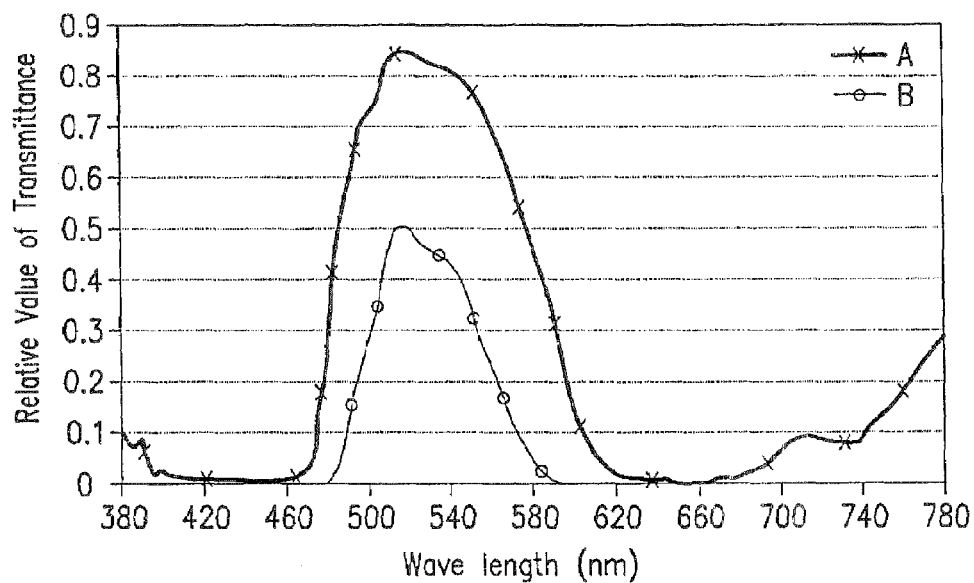
FIG. 4 shows spectrum graphs of a light passing through a 1.9 μm green color filter and a light passing through a green color filter according to an exemplary embodiment of the present invention.

FIG. 4 shows spectrum graphs of a light passing through a 1.9 μm green color filter and a light passing through a green color filter according to an exemplary embodiment of the present invention.

In FIG. 4, curve A represents a spectrum graph of a light passing through 1.9 μm green color filter, and curve B represents a spectrum graph of a light passing through a green color filter according to an exemplary embodiment of the present invention.

As shown in FIG. 4, the spectrum of the green light produced by the green color filter according to the present invention is distributed in a narrower wavelength range than that of the green light produced by a conventional green color filter having a thickness of 1.9 μm.

The overlapped red and green color filters 230R and 230G replace the black matrix in the exemplary embodiment of the present invention. The reason why the overlapped red and green color filters 230R and 230G can play a role of a black matrix will be described with reference to FIG. 5.

Figure 5:
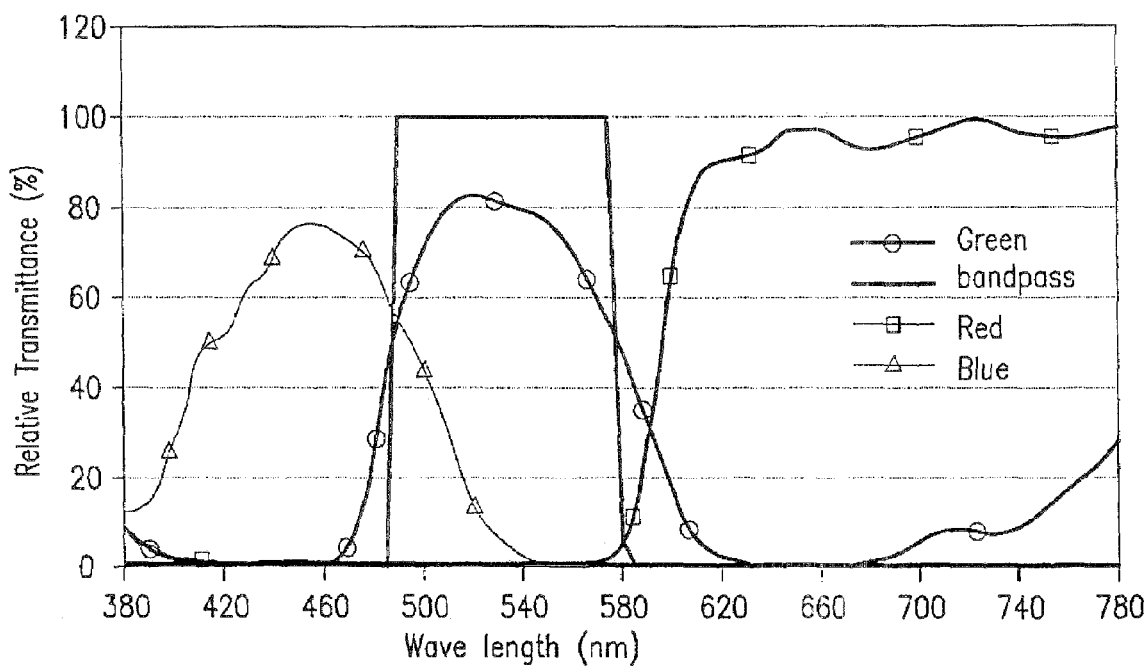
FIG. 5 shows spectrum graphs of three kinds of light respectively passing through three kinds of color filters according to an exemplary embodiment of the present invention.

FIG. 5 shows spectrum graphs of three kinds of lights respectively passing through three kinds of color filters according to an exemplary embodiment of the present invention.

As shown in FIG. 5, the green color filter 230G of the exemplary LCD according to the present invention is a band pass filter of wavelengths ranging from 495~580 nm, and the red color filter 230R is a high pass filter of wavelengths of 580 nm or longer. Accordingly, when a white light passes through both the green and red color filters 230G and 230R, all the light will be blocked by the color filters 230G and 230G to display black.

As described above, in the present invention, a green light having high color purity is produced by forming the green color filters on both sides of the upper substrate 210. The manufacturing method of an LCD is simplified by replacing the black matrix with the overlapped color filters 230R and 230G.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method of manufacturing a liquid crystal display, the method comprising:
    forming a first green color filter on an outer surface of a first substrate, wherein the first green color filter is removed at predetermined areas to expose the outer surface of the first substrate;
    forming a red color filter, a second green color filter, and a blue color filter on an inner surface of the first substrate;
    forming a pixel electrode on an inner surface of a second substrate;
    forming a common electrode on the inner surface of one of the first and second substrates; and
    forming a liquid crystal layer between the first substrate and the second substrate.

2. The method of claim 1, wherein the first green color filter is disposed on all the display area except at a red pixel area and a blue pixel area, the second green color filter is disposed on a green pixel area, the blue color filter is disposed on the blue pixel area, and the red color filter is disposed on all the display area except at the green and blue pixel areas.

3. The method of claim 2, wherein the first green color filter is at least 2.5 times thicker than the second green color filter.

4. A method of manufacturing a color filter panel, the method comprising:
    forming a first green color filter on a first surface of a transparent insulating substrate; and
    forming a red color filter, a second green color filter, and a blue color filter on a second surface of the insulating substrate,
    wherein the first green color filter is removed at predetermined areas to expose the first surface of the insulating substrate, the red color filter is disposed everywhere except at areas where the second green color filter and the blue color filter are disposed, and the red color filter and the blue color filter are seen through the predetermined areas exposing the first surface of the insulating substrate.

5. The method of claim 4, further comprising:
    forming a transparent electrode on the red color filter, the second green color filter, and the blue color filter.

6. The method of claim 4, wherein the thickness of the first green color filter is 2.5 times the thickness of the second green color filter.

7. A method of manufacturing a color filter panel, the method comprising:
    forming a first green color filter exclusively on a first surface of a substrate; and
    forming a red color filter, a second green color filter, and a blue color filter on a second surface of the substrate,
    wherein the first green color filter is removed at predetermined areas to expose the first surface of the substrate.

8. The method of claim 7, further comprising:
    forming a transparent electrode on the red color filter, the second green color filter, and the blue color filter.

9. A method of manufacturing a color filter panel, the method comprising:
    forming a red color filter, a first green color filter, and a blue color filter on a first surface of a substrate; and
    forming a second green color filter on a second surface of the substrate, the second green color filter overlapping a boundary of adjacent two of the red color filter, the first green color filter, and the blue color filter,
    wherein the second green color filter formed on the second surface is removed at predetermined areas to expose the second surface of the substrate.

10. The method of claim 9, further comprising:
    forming a transparent electrode on the red color filter, the first green color filter, and the blue color filter.

* * * * *